(12) United States Patent
Esmail et al.

(10) Patent No.: US 10,260,934 B2
(45) Date of Patent: Apr. 16, 2019

(54) PORTABLE SCALE SYSTEM

(71) Applicants: Riyaz Esmail, Andover, MA (US); Fatema Dahodwala, Andover, MA (US)

(72) Inventors: Riyaz Esmail, Andover, MA (US); Fatema Dahodwala, Andover, MA (US)

( * ) Notice: Subject to any disclaimer, the term of this patent is extended or adjusted under 35 U.S.C. 154(b) by 123 days.

(21) Appl. No.: 15/040,248

(22) Filed: Feb. 10, 2016

(65) Prior Publication Data

US 2017/0227395 A1 Aug. 10, 2017

(51) Int. Cl.
*G01G 19/52* (2006.01)

(52) U.S. Cl.
CPC .................... *G01G 19/52* (2013.01)

(58) Field of Classification Search
CPC ...................................... G01G 19/52
See application file for complete search history.

(56) References Cited

U.S. PATENT DOCUMENTS

| | | | |
|---|---|---|---|
| 3,266,584 A | 8/1966 | Lee | |
| 3,314,493 A | 4/1967 | Kennedy | |
| 3,935,913 A | 2/1976 | Wagner et al. | |
| 3,961,675 A * | 6/1976 | Siegel | G01G 19/445 177/126 |
| 4,437,561 A | 3/1984 | Hasegawa et al. | |
| 4,632,198 A | 12/1986 | Uchimura | |
| 5,994,649 A * | 11/1999 | Garfinkle | G01G 19/44 177/126 |
| 6,433,288 B1 | 8/2002 | Olafsson | |
| 6,919,516 B2 * | 7/2005 | Frye | G01G 3/1408 177/132 |
| 7,084,357 B2 | 8/2006 | Roberts et al. | |
| 7,279,645 B1 | 10/2007 | Inglin et al. | |
| 7,692,107 B1 * | 4/2010 | Shotey | G01G 19/58 177/131 |
| 7,994,440 B2 | 8/2011 | Oseko et al. | |
| 8,017,877 B1 * | 9/2011 | Cohen | G01G 19/44 177/126 |
| 8,237,066 B2 | 8/2012 | Rice | |
| 8,237,067 B2 | 8/2012 | Troisi et al. | |
| 8,969,743 B2 | 3/2015 | Huebler et al. | |
| 9,146,146 B2 | 9/2015 | Laird et al. | |
| 2004/0124017 A1 * | 7/2004 | Jones | G01G 19/445 177/144 |
| 2008/0035391 A1 * | 2/2008 | Jewett | G01G 21/22 177/126 |

(Continued)

FOREIGN PATENT DOCUMENTS

| | | |
|---|---|---|
| EP | 0319202 | 6/1989 |
| EP | 1244184 | 9/2002 |
| EP | 1506380 | 2/2005 |

*Primary Examiner* — Natalie Huls
(74) *Attorney, Agent, or Firm* — Lambert Shortell & Connaughton; Gary E. Lambert; David J. Connaughton, Jr.

(57) ABSTRACT

A scale system is provided. The scale system includes multiple scale portions which may be separated to weigh an item that may have multiple feet or wheels, such as luggage. Each scale portion is configured as a pedestal that may wirelessly communicate with a computing device. The computing device receives a signal input from each portion, calculates the total weight based on the signal inputs, and presents this information to a user.

19 Claims, 3 Drawing Sheets

(56) References Cited

U.S. PATENT DOCUMENTS

| | | | |
|---|---|---|---|
| 2008/0217072 A1* | 9/2008 | Domel | G01G 19/44 177/145 |
| 2009/0008859 A1 | 1/2009 | Fairweather et al. | |
| 2009/0032311 A1 | 2/2009 | Duppre | |
| 2011/0220425 A1 | 9/2011 | Denk et al. | |
| 2013/0220708 A1* | 8/2013 | Kim | G01G 19/025 177/3 |
| 2015/0122555 A1* | 5/2015 | Meeks | G01G 19/027 177/126 |
| 2016/0231166 A1* | 8/2016 | Malhotra | G01G 19/52 |
| 2016/0349105 A1* | 12/2016 | Oneda | G01G 21/28 |

* cited by examiner

PORTABLE SCALE SYSTEM

BACKGROUND OF THE INVENTION

Field of the Invention

The present invention relates generally to weighing devices. More particularly the present invention relates to a multi-piece scale system configured to weigh in item. The pieces of the scale system are configured to wirelessly transmit the reading to a wireless computing device for display.

Description of Related Art

When travelling, many airline carriers have instituted baggage weight restrictions. If a bag is over this weight restriction, customers are charged substantial fees and/or have to publicly unpack their baggage to lower the weight. In any event, finding out one's bag is over the airline-imposed weight limit is an inconvenience at best. Therefore, knowing the weight of a bag during packing is advantageous.

Currently, solutions to weigh one's bag during the packing stage include clumsy and hard-to-use hand scales, as well as using a bathroom bodyweight scale while holding the luggage in question, and subtracting total weight from body weight. Each solution faces a number of shortcomings. The hand scale requires a user to lift the luggage in an awkward manner that requires a substantial amount of arm strength. This can be difficult to impossible for many. The bodyweight scale solution suffers from being cumbersome and unreliable, and also suffers because for a return trip, typically this scale is not available.

Therefore, what is needed is a portable scale device that may simply and effectively weigh luggage.

SUMMARY OF THE INVENTION

The subject matter of this application may involve, in some cases, interrelated products, alternative solutions to a particular problem, and/or a plurality of different uses of a single system or article.

In one aspect, a scale system is provided. The scale system has a plurality of weighing pedestals. The weighing pedestals each have a body and a top platform. The top platform may have a ridge about its perimeter, a concave upper surface, or some other structure capable of limiting an item, particularly a wheeled item, from falling off the top of the pedestal. A load sensor is positioned in the body of each of the plurality of pedestals which is in communication with the top platform and configured to sense a weight load applied to the top platform. The load sensor is further configured to provide an electronic output such as a voltage corresponding to the load applied. A wireless transmitter may also be positioned in the body of each of the plurality of pedestals. The wireless transmitter is in communication with the load sensor, and is configured to provide an output signal based on the electronic output of the load sensor.

The scale system may further include a wireless computing device in wireless electronic communication with at least one of the wireless transmitters. The wireless computing device is configured to receive a signal from one or all of the wireless transmitters, to convert the signal into a weight measurement, and to present the weight measurement to the user.

In another aspect, the scale system may further include an item of luggage for weighing. The item of luggage typically will have four feet which are either legs or wheels (or a combination of the two). In operation of the scale system, each of the four feet is positioned on the top platform of one of the four pedestals. Any wheels of the luggage may be prevented from unintentional movement off the top platform by the ridge, concave face, or other structure. Once the luggage is in position, the wireless transmitter of pedestals may send a signal to the wireless computing device. The wireless computing device then may display the calculated weight measurement based on the signal input from at least one of the pedestals.

DETAILED DESCRIPTION

Figure 1:
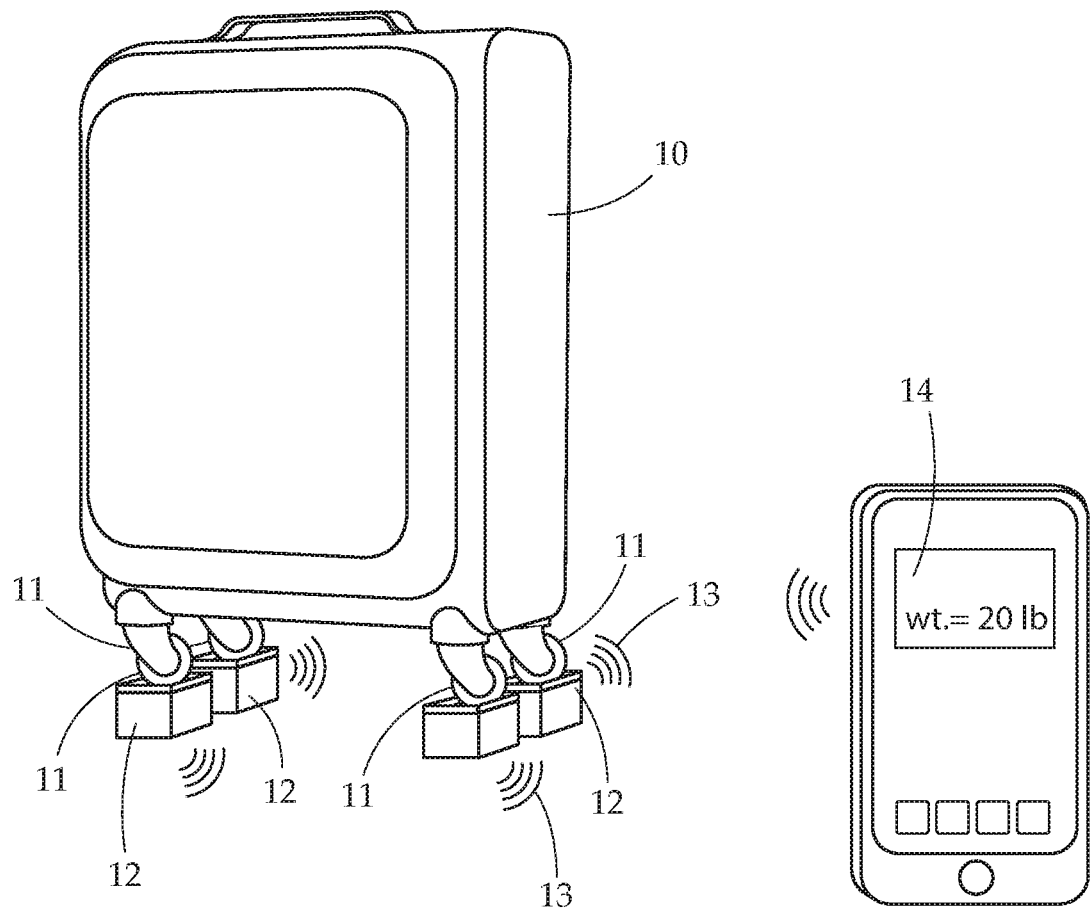
FIG. 1 provides a view of an embodiment of the scale system of the present invention.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a portable multi-piece scale system that can wirelessly transmit weight measurements for display on a computerized device.

In one embodiment, the scale device may have multiple weighing pedestals, each pedestal configured to be positioned under a portion of the structure to be weighed. In a particular embodiment, four pedestals may be used to comprise the scale. Typically, each pedestal has a load sensor and a wireless transmitter or transceiver. Each pedestal body contains the load sensor and the wireless transmitter/transceiver. In most embodiments, a battery or other power source may be utilized to provide electrical energy for operation. During the weighing process, the load sensor may receive at least a portion of a weight of an item, which will be output as a digital signal based on the load sensed by the load sensor. This signal may be transmitted to a computing device by the wireless transmitter. The computing device may then convert this signal into a weight, for display.

In an embodiment of use of the four-pedestal embodiment, each pedestal may be positioned under a wheel or foot of the luggage on each corner of the rectangular footprint luggage. The computing device is configured to receive all four signals (one from each pedestal). These signals may come from each pedestal, or from one 'master' pedestal which collects signals from other subordinate pedestals and then sends a combined signal to the computing device. The computerized device may then combine the recorded weight from each pedestal to calculate a total weight. However, it should be understood that varying embodiments may have different number of pedestals, and may be used for measuring items other than luggage.

Some embodiments of the present invention may be practiced on a computer system that includes, in general, one or a plurality of processors for processing information and instructions, RAM, for storing information and instructions, ROM, for storing static information and instructions, a data storage unit such as a magnetic or optical disk and disk drive for storing information and instructions, modules as software units executing on a processor, an optional user output device such as a display screen device (e.g., a monitor) for display screening information to the computer user, and/or an optional user input device. Further, many embodiments of computer systems of the present invention may have wireless communication capability, such as WiFi, Bluetooth, Infrared, radio, or other transmission capabilities.

Each pedestal of the scale device may be configured to receive an item on a top platform, to weigh this item using any number of load sensor structures capable of interpreting a weight, and to provide a wireless signal output based on this interpreted weight force on the top platform. In some embodiments, the platform may be movable with respect to the pedestal body, the movement being used to interpret the weight of the item on the top platform. In other embodiments, the weight may be determined in other manners with the platform non-moving (or only very slightly) with respect to the pedestal body. It should also be understood that in some cases, the orientation of the pedestals may be reversed, with the load platform being on a bottom of the pedestal. In this embodiment, the load platform may be formed, for example, as a plunger, a shaft portion of the plunger applying a force to a load sensor when a load is applied to the pedestal. However, this reversed orientation is within the scope of this invention, and the term top platform is used herein to apply to any body-platform orientation including a weighing platform on a bottom with an upper body on which items are placed for weighing.

A top platform of each pedestal may be a separated structure from a body of the pedestal, or may be a top surface of the body, depending on embodiment. In some embodiments, the platform may have an indented or concave surface. In other embodiments, the top platform may have an upwardly extending ridge about its perimeter. In either embodiment, the top platform structure may be designed to receive a wheel of a luggage and to prevent the wheel from unintendedly rolling off of the top platform. Such structure greatly aids in the ease of use of the scale system for luggage weighing because the luggage is held in place during the weighing process and when putting the luggage on the scale pedestals.

In one embodiment, the plurality of pedestals of the scale device may be connectable to each other. This connection may be achieved in any manner. Generally, pedestals are rectangular in shape allowing them to connect to other pedestals relatively fleshly and cleanly. Typically, connection is along the side walls of the pedestals, however other connection points and faces may be used as well without straying from the scope of the present invention. Examples of connecting structures that may be used to join the pedestals together include, but are not limited to: magnets, snap fittings, sliding male/female structures, hook and loop (Velcro®), and the like. In some embodiments, the connectors may have a particular configuration to urge connection in a particular order. For example, a male side connector may be on a left and front side of the pedestal, while a female side connector may be on a back and a right. This may allow connection in a line, square, or another predetermined shape.

Turning now to FIG. 1, a view of an embodiment of the present invention is provided. The scale system includes pedestals 12, which, in this embodiment are each positioned under a wheel 11 of luggage 10. During the weighing process, each pedestal transmits signal 13 which can be received by a wireless computing device 14. In this view, the wireless computing device 14 is shown as a smart phone, but may be any computer or electronic display capable of wireless communication with each pedestal 12. Upon receiving signal 13 from each pedestal 12 of the scale system, the wireless computing device 14 is configured to interpret each signal, calculate and convert the signal to a weight measurement, and display this calculation on a display of the computing device 14. This wireless communication may be achieved by a transmitter or transceiver positioned within each pedestal 12.

Figure 2:
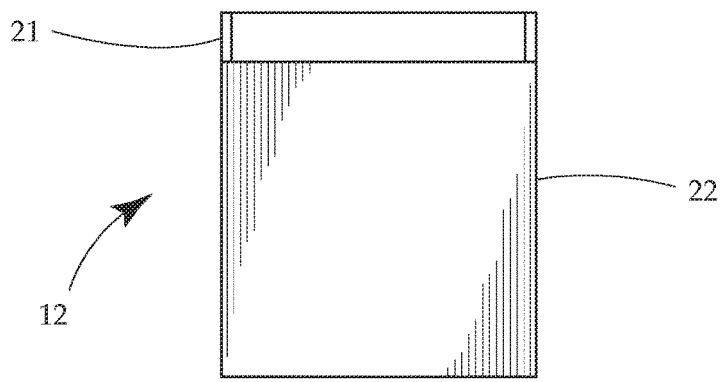
FIG. 2 provides a side view of an embodiment of a scale of the present invention.
Figure 3:
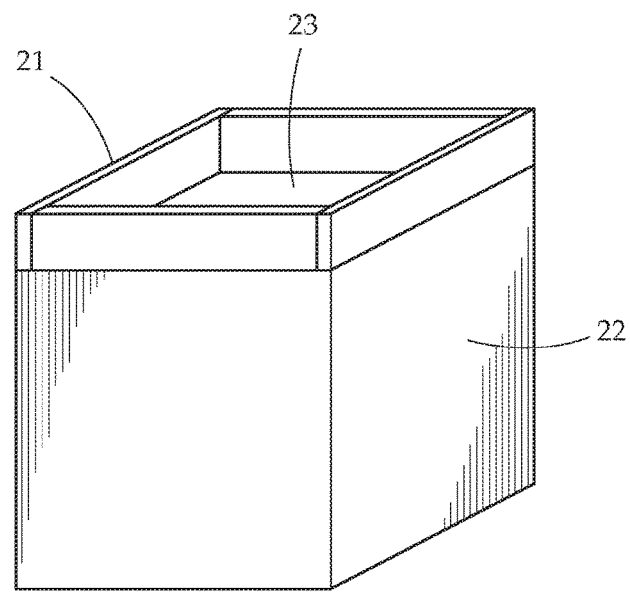
FIG. 3 provides a perspective view of an embodiment of a scale of the present invention.

FIGS. 2 and 3 show side and perspective views of an embodiment of a pedestal of the scale device. The pedestal 12 comprises a body 22 and top platform 23. The pedestal 12 contains a load sensor and transmitter/transceiver (not shown) within the body 22. Top platform 23 is configured to receive an item for weighing. The load sensor (not shown) is in communication with the top platform 23 and can generate a weight measurement based on a force applied to the top platform 23. In this embodiment, top platform 23 has a ridge 21 extending from its top surface about its perimeter. The ridge 21 may function to prevent a wheel or other portion of a weighed item from accidentally rolling/sliding off the pedestal, among other valuable functions.

Figure 4:
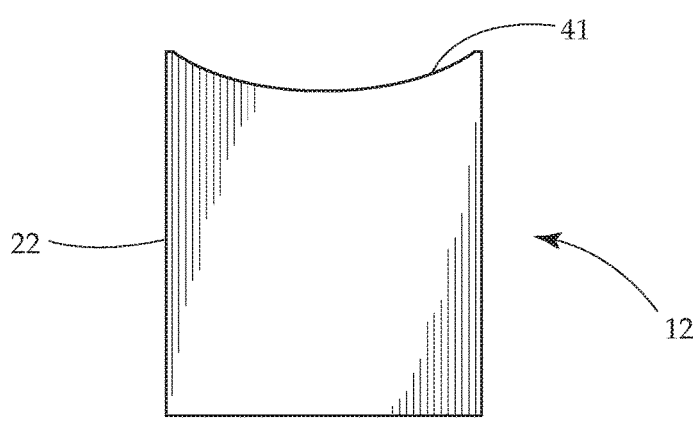
FIG. 4 provides a side view of another embodiment of a scale of the present invention.

FIG. 4 provides a side view of still another embodiment of the present invention. In this view, the pedestal 12 comprises a body 22 and top platform 41. The pedestal 12 contains a load sensor and transmitter/transceiver (not shown) within the body 22. Top platform 41 is configured to receive an item for weighing. In this view, top platform 41 has a concave face. This concave face may function to prevent a wheel or other portion of an item for weighing from accidentally rolling/sliding off the pedestal, among other valuable functions. In this embodiment, a two dimensional concave shape is shown. However, it should be understood that in other embodiments, the top platform 41 may be concave in three dimensions, such that its center is lower than all sides of the outer perimeter.

Figure 5:
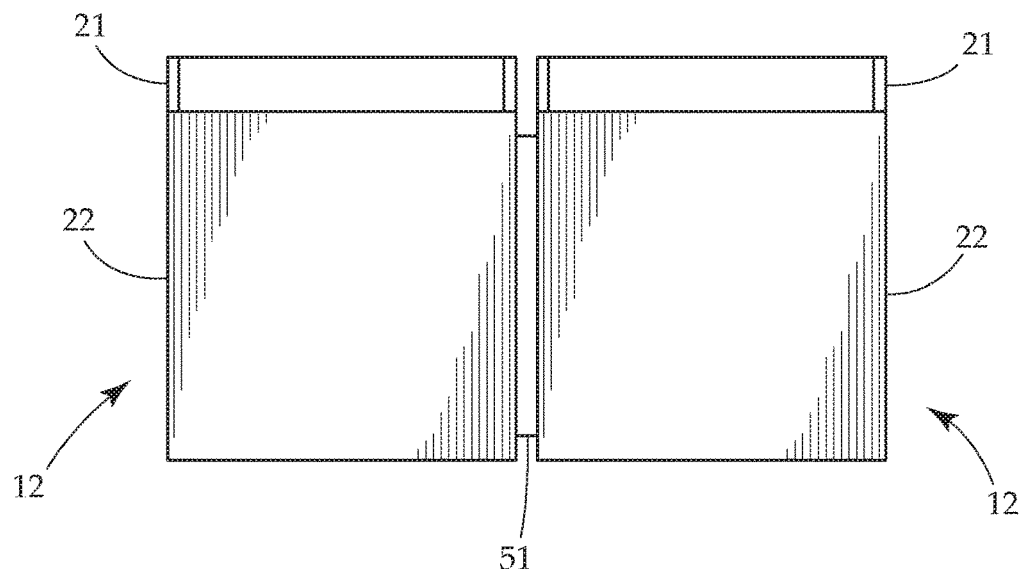
FIG. 5 provides a side view of an embodiment having two scales connected together.

FIG. 5 provides a side view of an embodiment of the scale system having two pedestals connected together. In this view, pedestals 12 are connected via a sliding male-female connection 51. As such, a first pedestal can slide vertically with respect to a second pedestal to separate the two. It should be understood however that any type of connecting structure may be used to connect the pedestals together without straying from the scope of this invention. Joining the pedestals 12 may be advantageous in a number of uses including, but not limited to: weighing larger items, weighing an item with fewer bottom contact points than pedestals, safe storage of the pedestals so they do not get lost, and the like.

Figure 6:
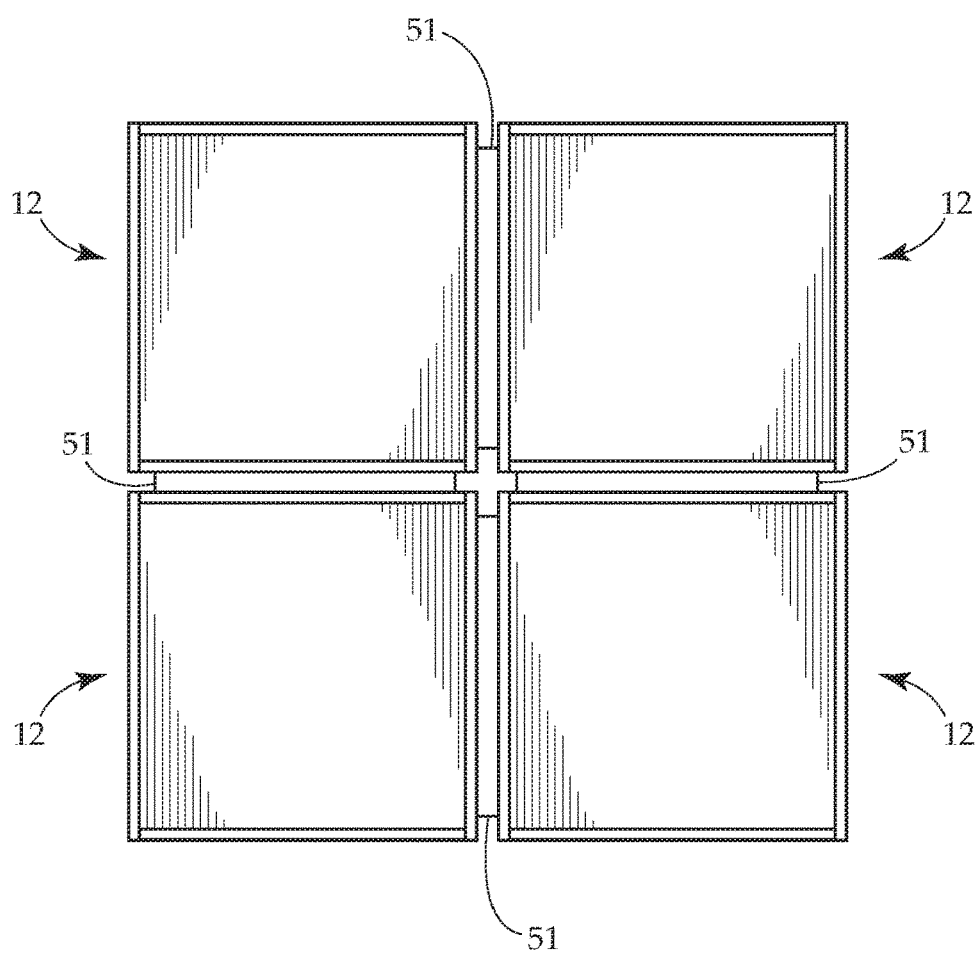
FIG. 6 provides an elevation view of an embodiment having four scales connected together.

FIG. 6 provides a top view of an embodiment of the scale system having four pedestals connected together. In this view, each pedestal is connected to two others, forming a square. The connection may be achieved by a horizontal sliding of two with respect to the other two, and then horizontally again with respect to each other. As noted, there may be a number of advantageous uses for such connection.

In one embodiment of use, a user may separate the pedestals and arrange them at distances approximately equal to the spacing of four wheels or legs of a piece of luggage. The luggage may be placed on the pedestals such that each wheel/leg is resting on one of the pedestals. Upon receiving this weight, each pedestal may automatically interpret the force applied using the load sensor, and then transmit this as a signal by the transmitter to a computing device. The computing device may then convert the four input signals to a weight measurement, and then may display the calculated weight on a display or otherwise present the weight to the user. In a particular embodiment, after weighing, the pedestals may be connected to each other and put away or potentially put in the luggage for weighing (of the luggage, the user, etc.) during travel.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A scale system comprising:
   a plurality of weighing pedestals, each of the weighing pedestals having a body and a top platform;
   a load sensor positioned in the body of each of the plurality of pedestals;
   a wireless transmitter positioned in the body of each of the plurality of pedestals, the wireless transmitter in communication with the load sensor and configured to communicate wirelessly with a wireless computing device by sending a signal relating to a weight measurement; and
   an item of luggage, the item of luggage comprising feet selected to be one of a wheel and a leg, each one of the feet positioned on the top platform of one of the pedestals.

2. The scale system of claim 1 wherein each of the plurality of pedestals is connectable to another of the plurality of pedestals.

3. The scale system of claim 2 wherein each of the plurality of pedestals is connectable to another of the plurality of pedestals along a side of each, and wherein the sides of the connectable pedestals are shaped to fit flushly together.

4. The scale system of claim 2 wherein the plurality of pedestals is each connectable to another by a slideable connection.

5. The scale system of claim 2 wherein the plurality of pedestals is each connectable to another by a magnetic connection.

6. The scale system of claim 1 wherein the plurality of pedestals comprises four pedestals.

7. The scale system of claim 1 wherein one of the plurality of pedestals comprises a wireless transmitter configured to send the signal to the wireless computing device, and wherein the wireless transmitter of another of the plurality of pedestals is configured to send a secondary signal to the one of the plurality of pedestals and not to the wireless computing device.

8. The scale system of claim 1 further comprising the wireless computing device in wireless electronic communication with at least one of the wireless transmitters, the wireless computing device configured to receive the signal from the at least one of the wireless transmitters, convert the signal into the weight measurement, and present the weight measurement to the user.

9. The scale system of claim 8 wherein the wireless computing device is configured to visually display the weight measurement on a display.

10. The scale system of claim 8 wherein the wireless computing device is configured to provide an audible output of the calculated weight measurement.

11. A scale system comprising:
    four weighing pedestals, each of the weighing pedestals having a body and a top platform;
    a load sensor positioned in the body of each of the pedestals;
    a wireless transmitter positioned in the body of each pedestal, the wireless transmitter in communication with the load sensor;
    a wireless computing device in wireless electronic communication with at least one of the wireless transmitters, the wireless computing device configured to receive a signal from the at least one of the wireless transmitters, convert the signal into a weight measurement, and present the weight measurement to the user; and
    an item of luggage, the item of luggage comprising four feet selected to be one of a wheel and a leg, each one of the four feet positioned on the top platform of one of the four pedestals, the wireless transmitter of the at least one of the pedestals configured to send the signal to the wireless computing device, the wireless computing device displaying the calculated weight measurement based on the signal input from the at least one pedestal.

12. A scale system comprising:
    a plurality of weighing pedestals, each of the weighing pedestals having a body and a top platform;
    a load sensor positioned in the body of each of the plurality of pedestals;
    a wireless transmitter positioned in the body of each of the plurality of pedestals, the wireless transmitter in communication with the load sensor and configured to communicate wirelessly with a wireless computing device by sending a signal relating to a weight measurement; and
    wherein each of the plurality of weighing pedestals is sized and configured to receive one of a plurality of feet of an item of luggage, such that the scale system is configured to determine a weight of the item of luggage; and
    wherein the plurality of pedestals is each connectable to another by a magnetic connection.

13. The scale system of claim 12 wherein each of the plurality of pedestals is connectable to another of the plurality of pedestals along a side of each, and wherein the sides of the connectable pedestals are shaped to fit flushly together.

14. The scale system of claim 12 wherein the plurality of pedestals is each connectable to another by a slideable connection.

15. The scale system of claim 12 wherein the plurality of pedestals comprises four pedestals.

16. The scale system of claim 15 further comprising the item of luggage, the item of luggage comprising four feet selected to be one of a wheel and a leg, each one of the four feet positioned on the top platform of one of the plurality of pedestals, the wireless transmitter of the at least one of the pedestals configured to send the signal to the wireless computing device.

17. The scale system of claim 12 further comprising the wireless computing device in wireless electronic communication with at least one of the wireless transmitters, the wireless computing device configured to receive the signal from the at least one of the wireless transmitters, convert the signal into the weight measurement, and present the weight measurement to the user, and wherein the wireless computing device is configured to visually display the weight measurement on a display.

18. The scale system of claim 17 wherein the wireless computing device is configured to provide an audible output of the calculated weight measurement.

19. The scale system of claim 17 wherein one of the plurality of pedestals comprises a wireless transmitter configured to send the signal to the wireless computing device, and wherein the wireless transmitter of another of the plurality of pedestals is configured to send a secondary signal to the one of the plurality of pedestals and not to the wireless computing device.

* * * * *